(12) United States Patent
Ohsawa et al.

(10) Patent No.: US 6,903,768 B1
(45) Date of Patent: Jun. 7, 2005

(54) SOLID STATE IMAGE SENSOR DEVICE FREE OF INFLUENCE ON OPTICAL BLACK LEVEL BY SIGNAL POTENTIAL CHANGE OF OPTICAL BLACK PIXELS

(75) Inventors: Shinji Ohsawa, Ebina (JP); Yukio Endo, Yokohama (JP); Yoshitaka Egawa, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/349,232

(22) Filed: Jul. 8, 1999

(30) Foreign Application Priority Data

Jul. 9, 1998 (JP) ............................................. 10-194586

(51) Int. Cl.[7] ............................................... H04N 5/217
(52) U.S. Cl. ..................... 348/241; 348/222.1; 348/245
(58) Field of Search ............................. 348/241, 222.1, 348/245, 243

(56) References Cited

U.S. PATENT DOCUMENTS

| 5,355,164 A | 10/1994 | Shimoyama et al. | 348/243 |
| 6,130,712 A | * 10/2000 | Miyazaki et al. | 348/243 |
| 6,239,839 B1 | * 5/2001 | Matsunaga et al. | 348/308 |

FOREIGN PATENT DOCUMENTS

| JP | 4-56477 | 2/1992 | |
| JP | 9-37155 | 2/1997 | |
| JP | 9-331420 | 12/1997 | |
| JP | 09-331420 | * 12/1997 | .......... H04N/1/028 |

* cited by examiner

Primary Examiner—Tuan Ho
Assistant Examiner—Heather R. Long
(74) Attorney, Agent, or Firm—Oblon, Spivak, McClelland, Maier & Neustadt, P.C.

(57) ABSTRACT

In a solid state image sensor device comprising a cell area wherein unit cells each having photoelectric diodes are arranged in a matrix form on a semiconductor substrate, the cell area being composed of a photo-sensitive pixel region for sensing an image, and an optical black pixel region for defining an optical black level, and a vertical shift register for selecting the unit cells of the image sensing cell array, in a group along each of horizontal lines, and vertical signal lines, each of which reads each of signals from the unit cells selected by turning on an address register by means of the vertical shift register, the vertical signal lines in the optical black pixel region are connected with each other through a wiring. Since the vertical signal lines in the optical black pixel region are connected with each other by a wiring, even if outputs from an optical black pixel region vary in the pixels, the outputs are made averaged and uniform and a variation in fixed pattern noises between the horizontal lines are reduced.

20 Claims, 7 Drawing Sheets

SOLID STATE IMAGE SENSOR DEVICE FREE OF INFLUENCE ON OPTICAL BLACK LEVEL BY SIGNAL POTENTIAL CHANGE OF OPTICAL BLACK PIXELS

BACKGROUND OF THE INVENTION

The present invention relates to an amplifying type solid state image sensor device for amplifying signal charge obtained by a photoelectric conversion element such as a photodiode, and in particular to a solid state image sensor device in which an optical black pixel region for defining an optical black level is improved.

Recently, a solid state image sensor device using a CMOS sensor has been proposed as one of solid state image sensor devices. This type of solid state image sensor device is a device wherein a signal detected by a photoelectric conversion element (photodiode) in each of cells is amplified by a transistor. Specifically, in this type of solid state image sensor device, the electrical potential in a signal charge accumulating portion is changed by signal charges generated by the photoelectric conversion element and the electrical potential is amplified by an amplifying transistor in each pixel. Such a solid state image sensor device is expected as an image sensor suitable for making the size of each pixel small.

Figure 10:
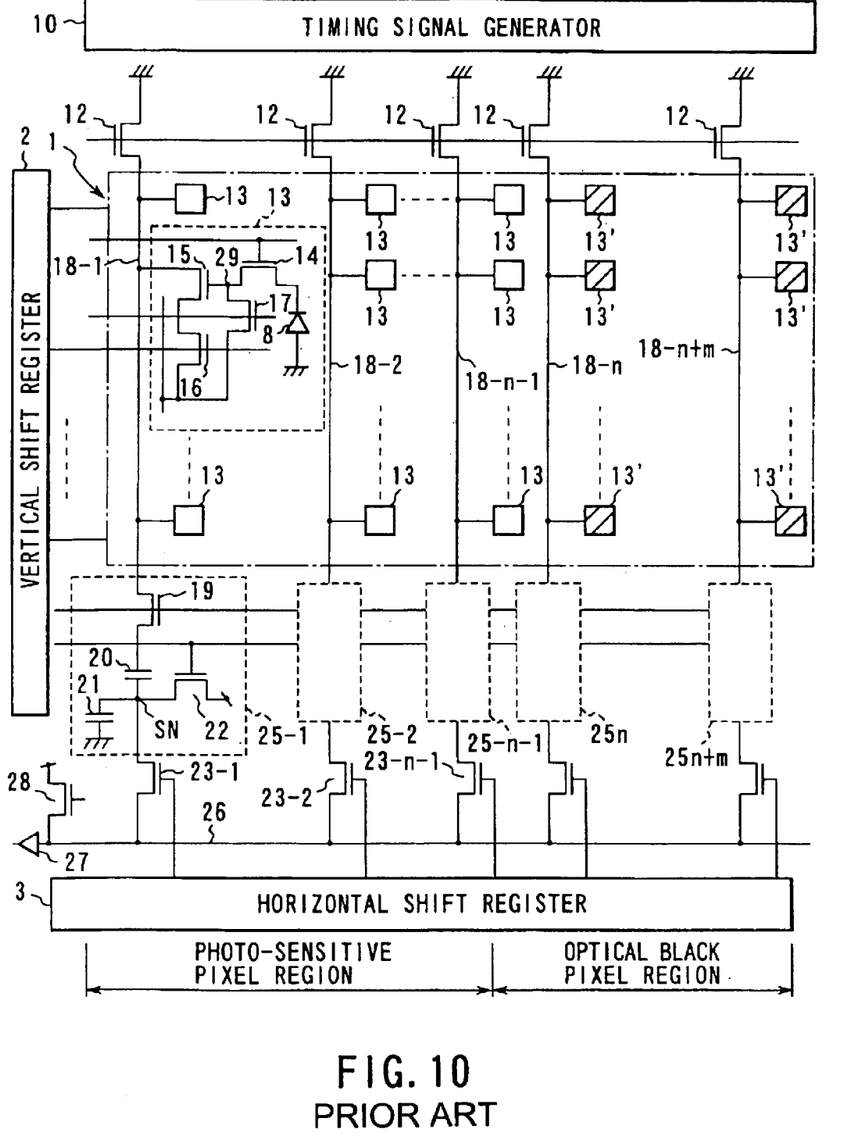
FIG. 10 is a circuit structure diagram of a conventional CMOS image sensor.

FIG. 10 shows an example of such a kind of CMOS image sensor in the prior art. In FIG. 10, reference numerals 1, 2, 3 and 10 represent an image sensing cell array, a vertical shift resistor, a horizontal shift resistor, and a timing signal generator, respectively. A plurality of unit cells 13 are arranged in the image sensing cell array, i.e., an image sensing cell area 1. Each of the unit cells 13 is composed of a photodiode 8, a read transistor 14, a driver transistor 15 of a source follower circuit, an address transistor 16, and a reset transistor 17.

Signal charges obtained in each of the unit cells 13 are read out as a signal on a vertical signal line 18 (typically showing any of vertical signal lines 18-1 to 18-(n+m)), supplied to a noise cancellor 25 (typically showing any of noise cancellors 25-1 to 25-(n+m)) through the vertical signal line 18. The signal supplied to the noise cancellor 25 through the vertical signal line 18 is temporarily stored in the noise cancellor 25. The noise cancellor 25 is composed of an S/H transistor 19, a signal transmitting capacitor 20, a signal accumulating capacitor 21, and a clamp transistor 22. The signal temporarily stored in the noise cancellor 25 is read out on a horizontal signal line 26 through a horizontal reading transistor 23, and then is outputted from the image sensor device through an output amplifier 27. In FIG. 10, reference numbers 12, 28 and 20 represent a load transistor, a horizontal reset transistor, and a detecting portion of the signal charges accumulated in the photodiode 8, respectively.

Most of the unit cells 13 constitute photo-sensitive pixels for sensing an image, on the other hand, a part of the unit cells 13 constitutes optical black pixels 13' for shielding an incident light and generating an optical black signal. Photodiodes of the optical black pixels 13' are covered with a layer made of aluminum or the like to prevent light from being projected onto the photodiodes. In the same manner as in the photo-sensitive pixels 13, the vertical signal lines 18-n to 18-(n+m), the noise cancellors 25-n to 25-(n+m), and horizontal reading transistors 23-n to 23-(n+m) are provided in the optical black pixels 13'.

An optical black pixel region composed of the optical black pixels 13' is necessary for defining an optical black level of an obtained signal, i.e., a dark current. That is, in any solid state image sensor device, electrical charges will be thermally generated in semiconductors constituting the device even when any light is not projected onto the device. The thermally generated electrical charges, together with signal charges generated by light projection, are accumulated in photodiodes of the respective pixels. Therefore, in order to detect only the signal charges generated based on the light projection, it is necessary to provide pixels where light is shielded and determine components of the thermally generated charges.

Figure 11:
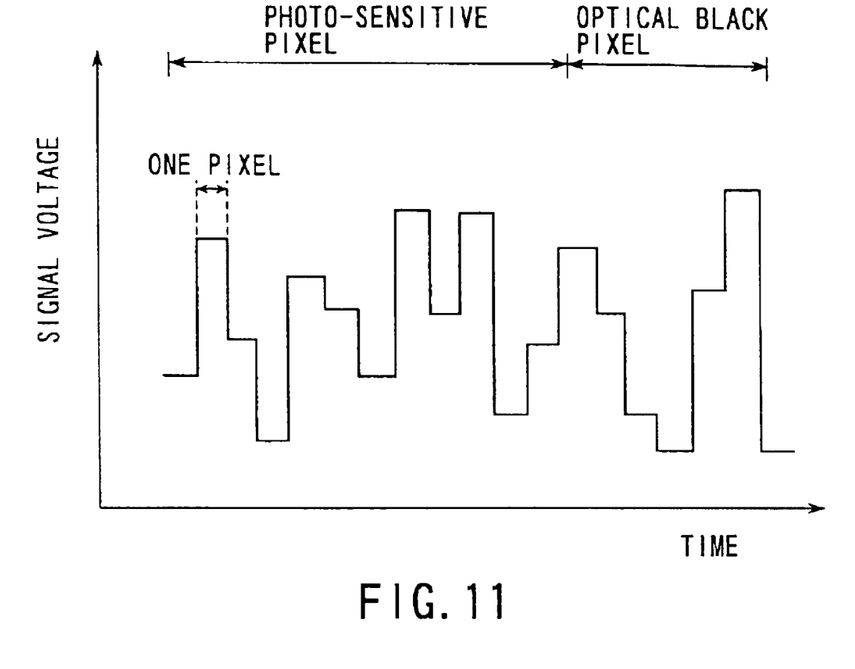
FIG. 11 is a diagram illustrating an output waveform of the conventional CMOS image sensor.
Figure 12:
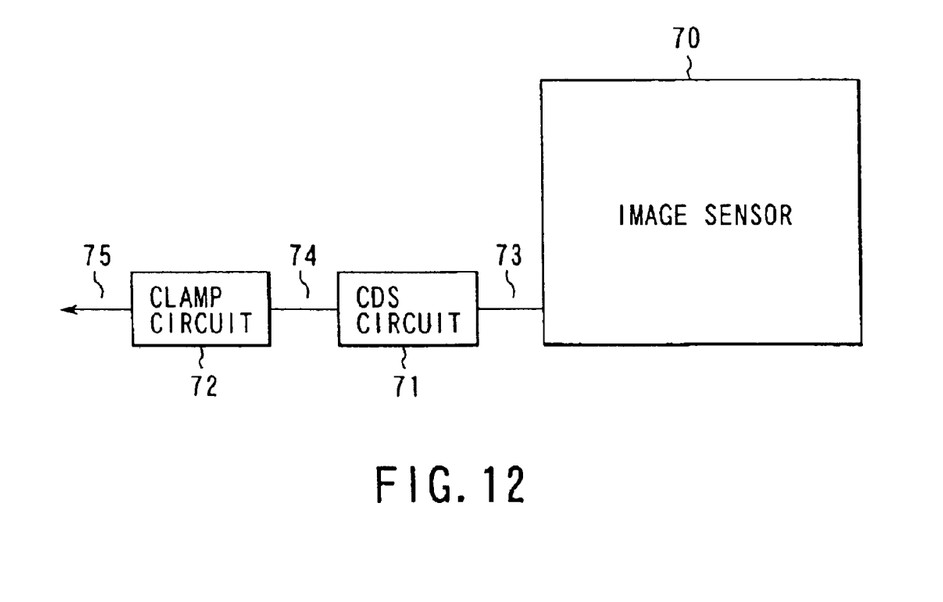
FIG. 12 is a block diagram illustrating an example of a signal processing circuit used in a CMOS image sensor.

In CMOS image sensors, as shown in FIG. 11, there arises a variation in level of the signals based on dark currents generated in the pixels. In CMOS image sensors, generally, the variation in optical black levels is about 2 mV. The following will describe a case that signals having such a variation are processed in a signal processing circuit of an image sensor, as shown in FIG. 12.

Figure 13A:
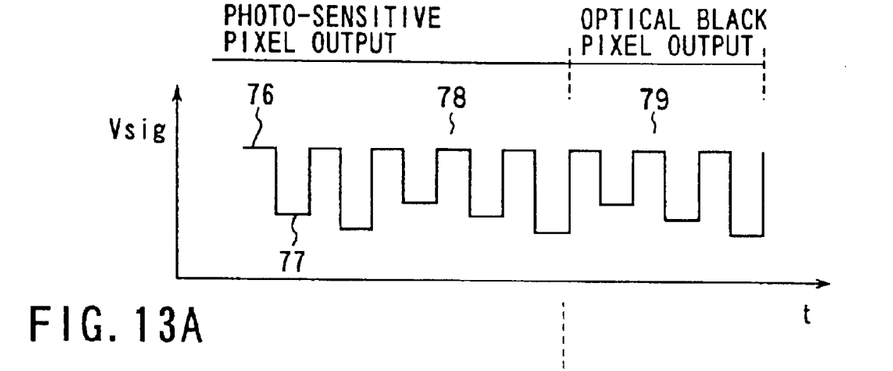
FIGS. 13A, 13B and 13C show signal waveforms in respective portions in case that the signal processing circuit shown in FIG. 12 is used.
Figure 13B:
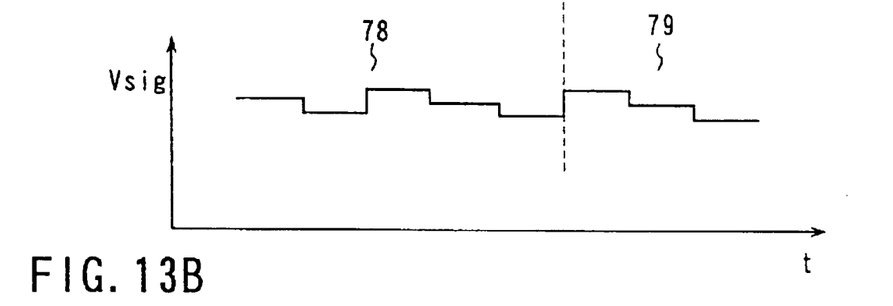
Figure 13C:
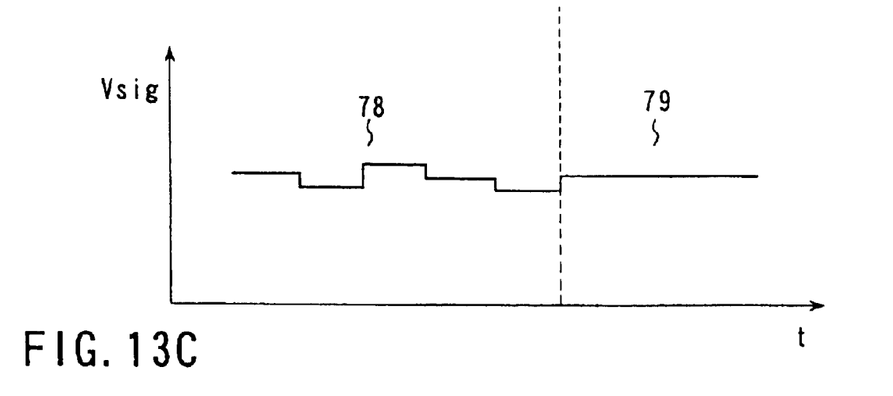

An output from an image sensor 70 has a waveform as shown in FIG. 13A on a signal line 73. The output from the image sensor 70 is composed of signals 78 from photo-sensitive pixels and signals 79 from optical black pixels, and has a reset level 76 and a signal level 77. FIG. 13B shows a signal waveform on a signal line 74, sampled by CDS (Correlation Double Sampling) circuit 71. Since the CDS circuit 71 is a circuit for obtaining the difference between the reset level 76 and the signal level 77, only the signal difference is obtained as the output-signal waveform of the CDS circuit 71. A clamp circuit 72 clamps a signal 79 from the optical black pixels (optical black level 79). A clamped signal waveform is shown in FIG. 13C.

However, such a kind of CMOS image sensor has the following disadvantage. Since there is a variation in levels of the signals generated by dark currents in the optical black pixels, optical black levels in the horizontal lines vary when the clamp circuit 72 clamps signals from the photo-sensitive pixels. This variation also causes a variation in a fixed pattern noise in each horizontal line.

As describe above, in amplifying type solid state image sensor devices using a CMOS sensor in the prior art, there is a variation in optical black signals obtained in the optical black pixels of the optical black pixel region for defining the optical black level. Thus, there remains a problem that a fixed pattern noise in each horizontal line is generated.

BRIEF SUMMARY OF THE INVENTION

The present invention has been made in the light of the above-mentioned situations. An object of the present invention is to provide a solid state image sensor device which, even if outputs from optical black pixels of an optical black pixel region vary, makes it possible to avoid disadvantages based on the variation satisfactorily and reduce the variation of the fixed pattern noises in the horizontal lines.

According to a first aspect of the present invention, there is provided a solid state image sensor device comprising an image sensing cell array portion including a plurality of unit cells, the unit cells being arranged in a matrix form on a semiconductor substrate, the image sensing cell array portion having a photo-sensitive pixel region and an optical black pixel region, the unit cells of the photo-sensitive pixel region for sensing an image, and the unit cells of the optical black pixel region for defining an optical black level; a selecting circuit for selecting the unit cells of the image sensing cell array portion in a unit of one horizontal line of the image sensing cell array portion; a plurality of vertical signal lines on which signals are read out from the unit cells selected by the selecting circuit; and a wiring shortcircuiting at least two of the vertical signal lines in the optical black pixel region with each other.

Since, in a solid state image sensor device according to the first aspect of the present invention, at least two of the vertical signal lines in the optical black pixel region are short-circuited with each other by a wiring, then the levels of the signal potentials on the short-circuited vertical signal lines can be averaged to be made uniform. For example, even if the level in one optical black pixel of the optical black pixel region is largely different from levels in the other optical black pixels, the difference can be reduced by connecting the vertical signal line associated with the one optical black pixel with the vertical signals lines associated with the other optical black pixels. Therefore, even if outputs from the optical black pixels of the optical black pixel region vary, the outputs can be averaged to reduce a variation in fixed pattern noises in the horizontal lines.

In a solid state image sensor device according to the first aspect of the present invention, at least one of the vertical signal lines in the optical black pixel region may be excluded from being short-circuited with the at least two vertical signal lines by the wiring.

In a solid state image sensor device according the first aspect of the present invention, at least one of the vertical signal lines in the optical black pixel region, which is at the side of the photo-sensitive pixel region, may be excluded from being short-circuited with the at least two vertical signal lines by the wiring. When a solid state image sensor device according the first aspect of the present invention is structured as such, then even if the signal potentials at the optical black pixels at the edge portion of the optical black pixel region are changed by light leaked from the photo-sensitive pixel region into the edge portion of the optical black pixel region, it is possible to prevent the optical black level from being influenced by the change. Thus, the optical black signal can be made stable.

In a solid state image sensor device according to the first aspect of the present invention, at least one of the vertical signal lines in the optical black pixel region, which is at the opposite side of the photo-sensitive pixel region, may be excluded from being short-circuited with the at least two vertical signal lines by the wiring. When a solid state image sensor device according to the first aspect of the present invention is structured as such, then even if the signal potentials at the optical black pixels at the opposite edge portion of the optical black pixel region are changed by light leaked from a peripheral portion opposite to the photo-sensitive pixel region into the opposite edge portion of the optical black pixel region, it is possible to prevent the optical black level from being influenced by the change. Thus, the optical black signal can be made more stable.

In a solid state image sensor device according to the first aspect of the present invention, at least one of the vertical signal lines in the optical black pixel region, which is at the side of the photo-sensitive pixel region, may be excluded from being short-circuited with the at least two vertical signal lines by the wiring, and at least one of the vertical signal lines in the optical black pixel region, which is at the opposite side of the photo-sensitive pixel region, may be excluded from being short-circuited with the at least two vertical signal lines by the wiring. When a solid state image sensor device according the first aspect of the present invention is structured as such, then even if the signal potentials at the optical black pixels at the edge portion of the optical black pixel region are changed by light leaked from the photo-sensitive pixel region into the edge portion of the optical black pixel region, it is possible to prevent the optical black level from being influenced by the change edge portion of the optical black pixel region are changed by light leaked from a peripheral portion opposite to the photo-sensitive pixel region into the opposite edge portion of the optical black pixel region, it is possible to prevent the optical black level from being influenced by the change. Thus, the optical black signal can be made more stable.

In a solid state image sensor device according to the first aspect of the present invention, the wiring may cause levels of the readout signals of the at least two vertical signal lines to be averaged.

According to a second aspect of the present invention, there is also provided a solid state image sensor device comprising an image sensing cell array portion including a plurality of unit cells, the unit cells being arranged in a matrix form on a semi-conductor substrate, the image sensing cell array portion having a photo-sensitive pixel region and a plurality of optical black pixel regions having optical black levels different from each other, the unit cells of the photo-sensitive pixel region for sensing an image, and the unit cells of the optical black pixel regions for defining optical black levels; a selecting circuit for selecting the unit cells of the image sensing cell array portion in a unit of one horizontal line of the image sensing cell array portion; a plurality of vertical signal lines on which signals are read out from the unit cells selected by the selecting circuit; and a wiring short-circuiting a plurality of the vertical signal lines in the optical black pixel regions with each other.

Since, in a solid state image sensor device according to the second aspect of the present invention, a plurality of optical black pixel regions are arranged the image sensing cell array portion, which have optical black levels different from each other, and a plurality of the vertical signal lines in the optical black pixel regions are short-circuited with each other by a wiring, then levels of the signals read out from the optical black pixels in each of the optical black pixel regions are averaged, and the averaged signal levels of the respective optical black pixel regions are also averaged. Thus, even if outputs from the optical black pixels of the optical black pixel regions vary, the outputs can be averaged to more reduce a variation in fixed pattern noises in the horizontal lines.

In a solid state image sensor device according to the second aspect of the present invention, at least one of the vertical signal lines in the optical black pixel regions may be excluded from being shortcircuited with the plurality of vertical signal lines by the wiring.

In a solid state image sensor device according to the second aspect of the present invention, at least one of the vertical signal lines in the optical black pixel regions, which is at the side of the photosensitive pixel region, may be excluded from being short-circuited with the plurality of vertical signal lines by the wiring. When a solid state image sensor device according the second aspect of the present invention is structured as such, then even if the signal potentials at the optical black pixels at the edge portion of the optical black pixel region close to the photo-sensitive pixel region are changed by light leaked from the photo-sensitive pixel region into the edge portion of the optical black pixel region, it is possible to prevent the optical black level from being influenced by the change. Thus, the optical black signal can be made stable.

In a solid state image sensor device according to the second aspect of the present invention, at least one of the vertical signal lines in the optical black pixel regions, which is at the opposite side of the photo-sensitive pixel region, may be excluded from being short-circuited with the plurality of vertical signal lines by the wiring. When a solid state image sensor device according to the second aspect of the present invention is structured as such, then even if the signal potentials at the optical black pixels at the opposite edge portion of the optical black pixel region are changed by light leaked from a peripheral portion opposite to the photo-sensitive pixel region into the opposite edge portion of the optical black pixel region, it is possible to prevent the optical black level from being influenced by the change. Thus, the optical black signal can be made more stable.

In a solid state image sensor device according to the second aspect of the present invention, at least one of the vertical signal lines in the optical black pixel regions, which is at the side of the photo-sensitive pixel region, may be excluded from being short-circuited with the plurality of vertical signal lines by the wiring, and at least one of the vertical signal lines in the optical black pixel regions, which is at the opposite side of the photo-sensitive pixel region, may be excluded from being short-circuited with the plurality of vertical signal lines by the wiring. When a solid state image sensor device according the third aspect of the present invention is structured as such, then even if the signal potentials at the optical black pixels at the edge portion of the optical black pixel region close to photo-sensitive pixel region are changed by light leaked from the photo-sensitive pixel region into the edge portion of the optical black pixel region, it is possible to prevent the optical black level from being influenced by the change. Furthermore, even if the signal potentials at the optical black pixels at the opposite edge portion of the optical black pixel region are changed by light leaked from a peripheral portion opposite to the photo-sensitive pixel region into the opposite edge portion of the optical black pixel region, it is possible to prevent the optical black level from being influenced by the change. Thus, the optical black signal can be made more stable.

In a solid state image sensor device according to the second aspect of the present invention, the plurality of optical black pixel regions may comprise at least two optical black pixel regions, the unit cells of one of which may include a PN junction diode as a photoelectric conversion element and the unit cells of the other of which may include no PN junction diode.

In a solid state image sensor device according to the second aspect of the present invention, the wiring may cause levels of the readout signals of the plurality of vertical signal lines to be averaged.

According to a third aspect of the present invention, there is further provided a solid state image sensor device comprising an image sensing cell array portion including a plurality of unit cells, the unit cells being arranged in a matrix form on a semiconductor substrate, the image sensing cell array portion having a photo-sensitive pixel region, a first optical black pixel region and a second optical black pixel region having an optical black level different from that of the first optical black pixel region, the unit cells of the photo-sensitive pixel region for sensing an image, and the unit cells of the first and second optical black pixel regions for defining optical black levels; a selecting circuit for selecting the unit cells of the image sensing cell array portion in a unit of one horizontal line of the image sensing cell array portion; a plurality of vertical signal lines on which signals are read out from the unit cells selected by the selecting circuit; and a wiring short-circuiting at least two of the vertical signal lines in the first and second optical black pixel regions with each other, one of which being in the first optical black pixel region and another one of which being in the second optical black pixel region.

Since, in a solid state image sensor device according to the third aspect of the present invention, a first optical black pixel region and a second optical black pixel region are arranged the image sensing cell array portion, which have optical black levels different from each other, and at least two of the vertical signal lines in the first and second optical black pixel regions, one of which being in the first optical black pixel region and another one of which being in the second optical black pixel region are short-circuited with each other by a wiring, then levels of the signals read out from the optical black pixels in each of the first and second optical black pixel regions are averaged, and the averaged signal levels of the first and second optical black pixel regions are also averaged. Thus, even if outputs from the optical black pixels of the optical black pixel regions vary, the outputs can be averaged to more reduce a variation in fixed pattern noises in the horizontal lines.

In a solid state image sensor device according to the third aspect of the present invention, at least one of the vertical signal lines in the first and second optical black pixel regions may be excluded from being short-circuited with the at least two vertical signal lines by the wiring.

In a solid state image sensor device according to the third aspect of the present invention, at least one of the vertical signal lines in the first and second optical black pixel regions, which is at the side of the photo-sensitive pixel region, may be excluded from being short-circuited with the at least two vertical signal lines by the wiring. When a solid state image sensor device according the third aspect of the present invention is structured as such, then even if the signal potentials at the optical black pixels at the edge portion of the optical black pixel region close to the photo-sensitive pixel region are changed by light leaked from the photo-sensitive pixel region into the edge portion of the optical black pixel region, it is possible to prevent the optical black level from being influenced by the change. Thus, the optical black signal can be made stable.

In a solid state image sensor device according to the third aspect of the present invention, at least one of the vertical signal lines in the first and second optical black pixel regions, which is at the opposite side of the photo-sensitive pixel region, may be excluded from being short-circuited with the at least two vertical signal lines by the wiring. When a solid state image sensor device according to the third aspect of the present invention is structured as such, then even if the signal potentials at the optical black pixels at the opposite edge portion of the optical black pixel region are changed by light leaked from a peripheral portion opposite to the photo-sensitive pixel region into the opposite edge portion of the optical black pixel region, it is possible to prevent the optical black level from being influenced by the change. Thus, the optical black signal can be made more stable.

In a solid state image sensor device according to the third aspect of the present invention, at least one of the vertical signal lines in the first and second optical black pixel regions, which is at the side of the photo-sensitive pixel region, may be excluded from being short-circuited with the at least two vertical signal lines by the wiring, and at least one of the vertical signal lines in the first and second optical black pixel regions, which is at the opposite side of the photo-sensitive pixel region, may be excluded from being short-circuited with the at least two vertical signal lines by the wiring. When a solid state image sensor device according to the third aspect of the present invention is structured as such, then even if the signal potentials at the optical black pixels at the edge portion of the optical black pixel region close to the photo-sensitive pixel region are changed by light leaked from the photo-sensitive pixel region into the edge portion of the optical black pixel region, it is possible to prevent the optical black level from being influenced by the change. Furthermore, even if the signal potentials at the optical black pixels at the opposite edge portion of the optical black pixel region are changed by light leaked from a peripheral portion opposite to the photo-sensitive pixel region into the opposite edge portion of the optical black pixel region, it is possible to prevent the optical black level from being influenced by the change. Thus, the optical black signal can be made more stable.

In a solid state image sensor device according to the third aspect of the present invention, the unit cells of the first optical black pixel region may include a PN junction diode as a photoelectric conversion element and the unit cells of the second optical black pixel region may include no PN junction diode.

In a solid state image sensor device according to the third aspect of the present invention, the wiring may cause levels of the readout signals of the at least two vertical signal lines to be averaged.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The present invention will be described in detail with reference to the embodiments illustrated, below.

[First Embodiment]

Figure 1:
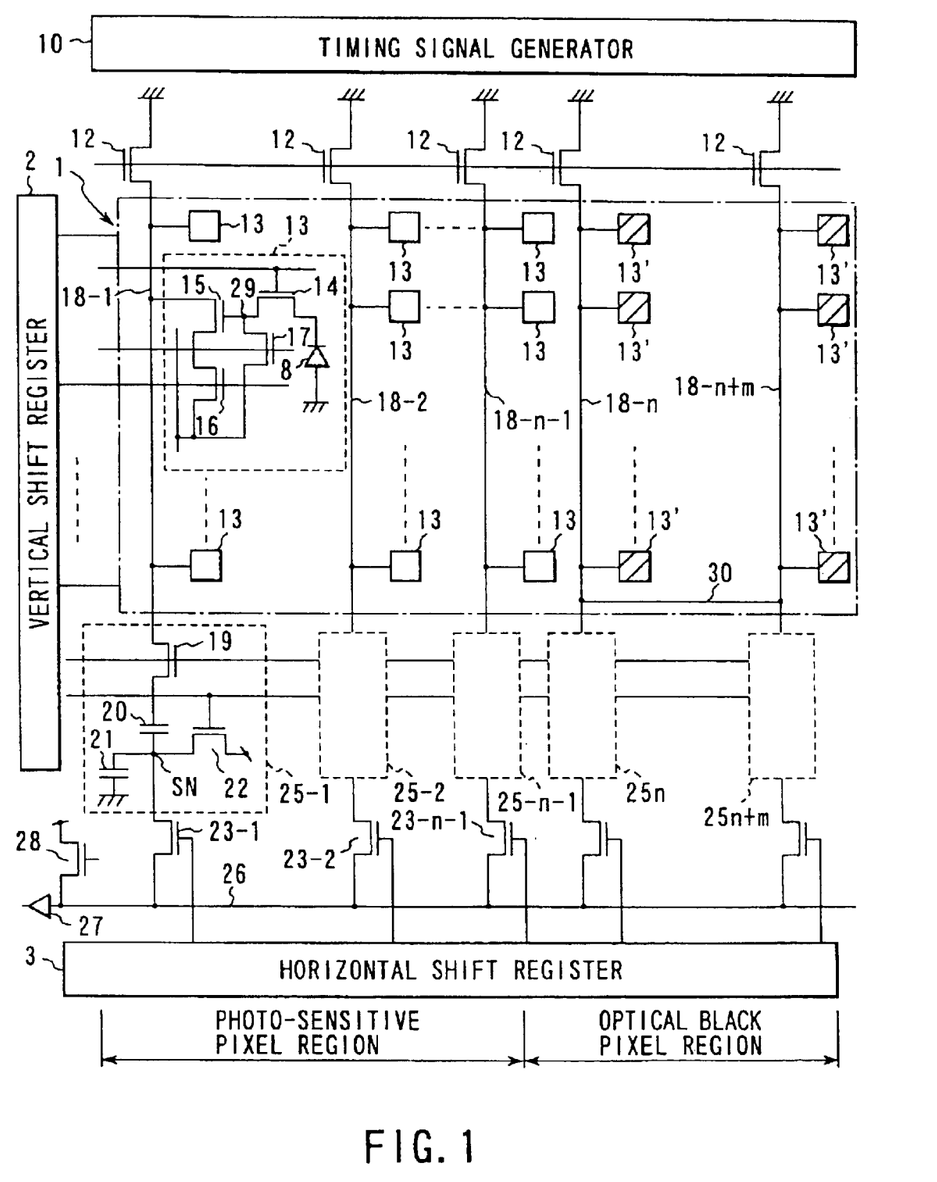
FIG. 1 is a circuit structure diagram illustrating a CMOS image sensor according to a first embodiment of the present invention.

FIG. 1 is a circuit structure diagram illustrating a CMOS image sensor according to a first embodiment of the present invention.

In FIG. 1, reference numbers 1, 2, 3 and 10 represent an image sensing cell array (i.e., image sensing cell region, a vertical shift resistor, a horizontal shift resistor, and a timing signal generator, respectively. A plurality of unit cells 13 are arranged in a matrix form in the image sensing cell array 1, i.e., an image sensing cell area. Each of the unit cells 13 is composed of a photodiode 8 as a photoelectric conversion element, a read transistor 14 for reading electrical charges accumulated in the photodiode 8 as a signal, a driver transistor 15 which constitutes, together with a load transistor 12 described later, a source follower so as to amplify the read out signal and output an amplified signal, an address transistor 16 for selecting a horizontal line to be read, and a reset transistor 17 for resetting the charge of the photodiode 8. The load transistor 12 is arranged outside the image sensing cell array 1, and DC voltage is applied to the load transistor 12. The load transistor 12 is shared by the driver transistors 15 of the unit cells 13 of one vertical signal line.

Signal charges obtained in each of the unit cells 13 are read out as a signal on a vertical signal line 18 (typically showing any of vertical signal lines 18-1 to 18-(n+m)) by the source follower circuit composed of the load transistor 12 and the driver transistor 15, and supplied to a noise cancellor 25 (typically showing any of noise cancellors 25-1 to 25-(n+m)). The signal charges supplied to the noise cancellor 25 through the vertical signal line 18 are temporarily stored in the noise cancellor 25. The noise cancellor 25 functions as a signal holding circuit and temporarily stores the signal charges read out on the vertical signal line 18 and removes noises inherent to the device. The noise cancellor 25 is composed of an S/H transistor 19, a signal transmitting capacitor 20, a signal accumulating capacitor 21, and a clamping transistor 22.

The signals which are temporarily stored in the noise cancellors 25 and from which noises are removed are successively selected by a horizontal shift resistor 3 functioning as a signal reading circuit, and are read out on a horizontal signal line 26 through horizontal reading transistors 23 (typically showing reading transistors 23-1 to 23-

(n+m)), and then are outputted to outside of the image sensor device through an output amplifier 27. A horizontal reset transistor 28 for resetting potential of the horizontal signal line 26 is connected to the horizontal signal line 26.

Most of the unit cells 13 constitutes photo-sensitive pixels for sensing an image, on the other hand, a part of the unit cells 13 constitutes optical black pixels 13' for shielding an incident light and generating an optical black signal. The optical black pixels 13' defines an optical black level based on a dark current. Photodiodes of the optical black pixels 13' are covered with a layer made of aluminum or the like. In the same manner as in the photo-sensitive pixels 13, the vertical signal lines 18-n to 18-(n+m), the noise cancellors 25-n to 25-(n+m), and horizontal reading transistors 23-n to 23-(n+m) are provided in the optical black pixels 13'.

In the above-mentioned structure, light incident on the photodiodes 8 in the unit cells 13 is photoelectrically converted and accumulated as signal charges in the photodiodes 8. The unit cells 13 are selected in a unit of one horizontal line by turning on the address transistors 16 contained in the unit cells 13 of the one horizontal line by means of the vertical shift register 2 functioning as a selecting circuit. In each of the unit cells 13, the reset transistor 17 is turned on so that the reset level of signal is transmitted to the signal accumulating capacitors 21 through the signal transmitting capacitors 20. At this time, the clamp transistors 22 of the unit cells 13 are turned on so that the voltage levels of the capacitors 21 of the unit cells 13 are averaged.

The read transistor 14 of each of the unit cells 13 is turned on so that the signal is read out to the detecting portions 29, and a change in the voltage at the detecting portions 29 is outputted to the vertical signal line 18 through the driver transistor 15. The change in the signal voltage is accumulated, as the quantity of the charge, in the signal accumulating capacitor 21 through the S/H (sample/hold) transistors 19. The S/H transistors 19 and the address transistors 16 are turned off so that the noise cancellors 25 are separated from the image sensing cell array 1 to make a non-select state of the unit cells.

After a series of these operations has been finished, the voltage at the horizontal signal line 26 is reset via the horizontal reset transistor 28. The horizontal reading transistors 23 are successively turned on, so that the signals are read out on the horizontal signal line 26 and outputted to outside of the image sensor device through the output amplifier 27. After reading of the signals from unit cells 13 of one horizontal line has been finished, signals from unit cells 13 of the succeeding horizontal line are then read out in the same manner.

The above-mentioned basic structure and operation are the same as the conventional device shown in FIG. 10. The present embodiment is, however, different from the conventional device in that the respective vertical signal lines in the optical black pixel region are interconnected with each other. That is, the vertical signal lines 18-n to 18-(n+m) in the optical black pixel region are electrically connected by means of a wiring 30 made of aluminum or the like in the image sensing cell array 1, as shown in FIG. 10.

Figure 2:
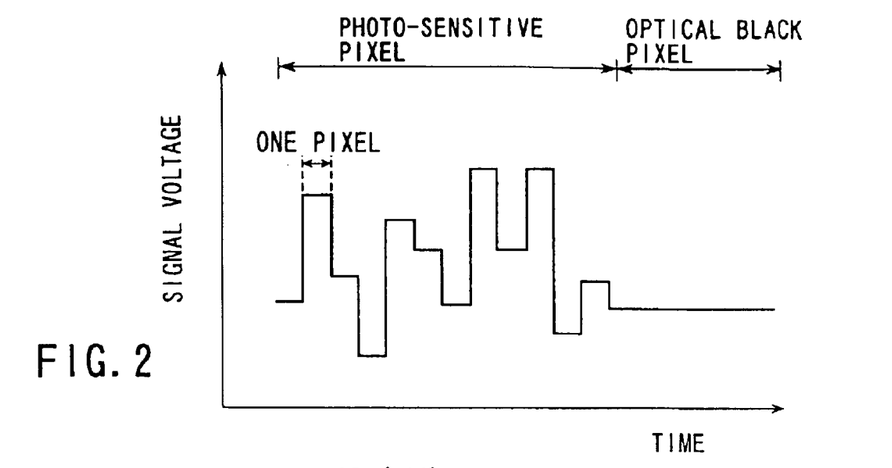
FIG. 2 is a diagram showing a state wherein the voltages at vertical signal lines in an optical black pixel region are averaged according to the first embodiment of the present invention.

According to the present embodiment, the voltages at the vertical signal lines 18 in the optical black pixel region are made to be averaged and uniform, as shown in FIG. 2, since these vertical signal lines 18 are interconnected with each other. Therefore, when the signals on the respective horizontal lines outputted from the optical black pixel region are clamped, variation in these signals are made very small. As a result, it is possible to prevent variation in fixed pattern noises of horizontal lines. According to the above embodiment, only the wiring 30 for connecting the vertical signal lines is added to the conventional image sensor device. This does not cause a great change in the structure of conventional image sensor devices, and accordingly the image sensor device of the above embodiment can easily be realized.

[Second Embodiment]

Figure 3:
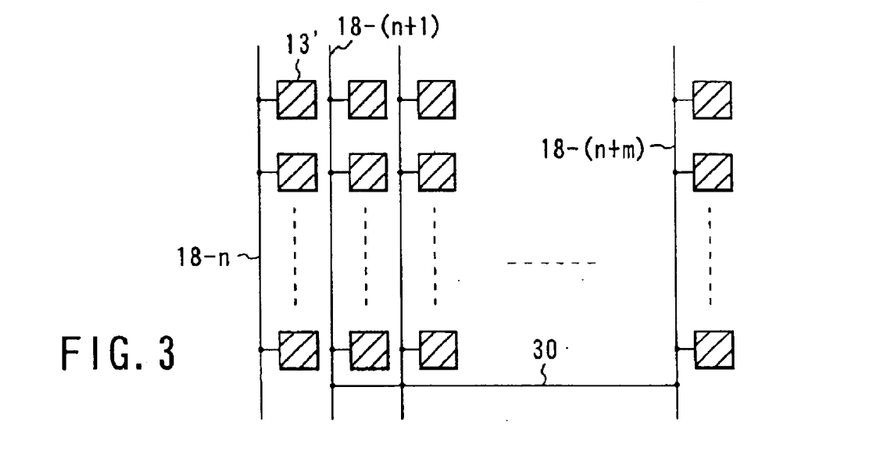
FIG. 3 is a diagram illustrating the structure of an optical black pixel region of a CMOS image sensor according to a second embodiment of the present invention.

FIG. 3 is a diagram illustrating the structure of an optical black pixel region of a CMOS image sensor according to a second embodiment of the present invention. The same reference numerals are used to the same elements as in FIG. 1. Thus, detailed explanation thereof is omitted.

The present embodiment is different from the above-mentioned first embodiment in that when the vertical signal lines 18 in the optical black pixel region are electrically interconnected with each other by means of the wiring 30, at least one (i.e., a vertical signal line 18-n in FIG. 3) of these vertical signal lines 18 at the side of the photo-sensitive pixel region is excluded from being connected to the interconnected vertical signal lines. Thus, an optical black level is defined by the signals of the vertical signal lines 18 (i.e., vertical signal lines 18-(n+l) to 18-(n+m) in FIG. 3) connected by means of the wiring. 30, of all of the vertical signal lines 18 in the optical black pixel region.

With above-mentioned structure of the image sensor device, the same advantages as the first embodiment can be obtained. Moreover, even if the signal potentials at the optical black pixels at the edge portion of the optical black pixel region are changed by light leaked from the photo-sensitive pixel region into the edge portion of the optical black pixel region, it is possible to prevent the optical black level from being influenced by the change. Thus, the optical black signal can be made stable.

[Third Embodiment]

Figure 4:
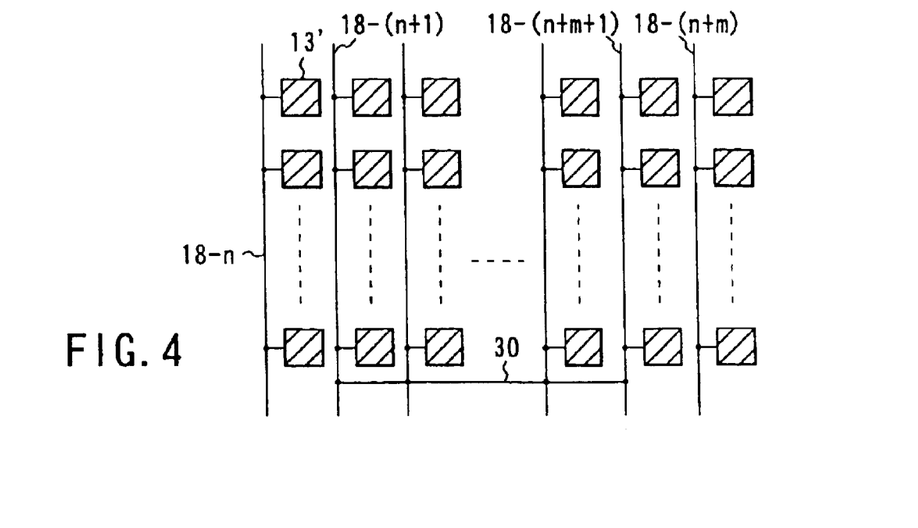
FIG. 4 is a diagram illustrating the structure of an optical black pixel region of a CMOS image sensor according to a third embodiment of the present invention.

FIG. 4 is a diagram illustrating the structure of an optical black pixel region of a CMOS image sensor according to a third embodiment of the present invention. The same reference numerals are used to the same elements as in FIG. 1. Thus, detailed explanation thereof is omitted.

The present embodiment is different from the above-mentioned first embodiment in that when the vertical signal lines 18 in the optical black pixel region are electrically interconnected with each other by means of the wiring 30, at least one (i.e., a vertical signal line 18-n in FIG. 4) of these vertical signal lines 18 at the side of the photo-sensitive pixel region is excluded from being connected to the interconnected vertical signal lines, and further in that at least one (i.e., a vertical signal line 18-(n+m) in FIG. 4) of these vertical signal lines 18 at the opposite side of the photo-sensitive pixel region is excluded from being connected to the interconnected vertical signal lines. Thus, an optical black level is defined by the signals of the vertical signal lines (18-(n+l) to 18-(n+m-1) in FIG. 4) connected by means of the wiring 30, of all of the vertical signal lines 18 in the optical black pixel region.

With above-mentioned structure of the image sensor device, the same advantages as the first embodiment can be obtained. Moreover, even if the potentials at the optical black pixels at the edge portion of the optical black pixel region close to the photo-sensitive pixel region are changed by light leaked from the photo-sensitive pixel region into the edge portion of the optical black pixel region, it is possible to prevent the optical black level from being influenced by the change. Furthermore, even if the signal potentials at the optical black pixels at the opposite edge portion of the optical black pixel region are changed by light leaked from a peripheral portion opposite to the photosensitive pixel region into the opposite edge portion of the optical black pixel region, it is possible to prevent the optical black level from being influenced by the change. Thus, the optical black signal can be made more stable in the present embodiment than in the second embodiment.

[Fourth Embodiment]

The following will describe a CMOS image sensor according to a fourth embodiment of the present invention.

In the present embodiment, signals from the optical black pixel region shown in FIG. 1 are set to at least two different levels according to locations of the optical black pixel portions.

Figure 5:
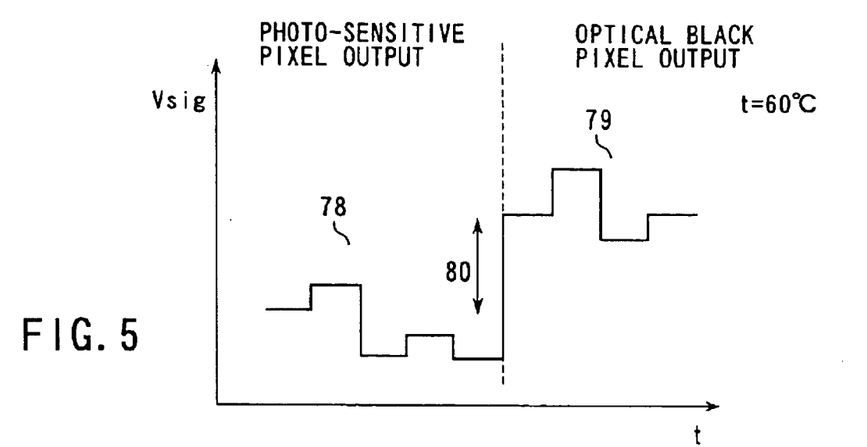
FIG. 5 is a diagram illustrating a signal waveform at high temperature in a conventional CMOS image sensor.
Figure 6:
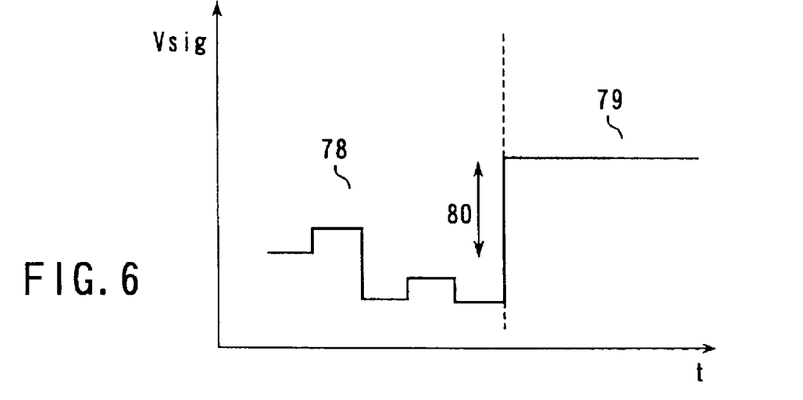
FIG. 6 is a diagram illustrating a signal waveform at high temperature in a CMOS image sensor wherein vertical signal lines in an optical black pixel region are connected with each other.

As the device temperature of CMOS image sensors becomes higher, dark current, in particular at the optical black pixel region, generally increases. When the device temperature becomes a high temperature of, for example, 60° C., the dark current at the optical black pixel region becomes larger than the dark current at the photo-sensitive pixel region. Therefore, a level of the signal 79 of the optical black pixel region becomes larger than a level of the signal 78 of the photo-sensitive pixel region by a signal level difference 80, as shown in FIG. 5. If at this time the vertical signal lines in the optical black pixel region are interconnected with each other, the level of the signal 79 becomes constant as shown in FIG. 6. However, there is a large difference between the signal level of the optical black pixel region and the signal level of the photo-sensitive pixel region by the signal level difference 80. Accordingly, there is a disadvantage that in order to receive a signal having a smaller level than that of the optical black signal in a subsequent signal processing circuit, a larger circuit margin is necessary to be added.

Figure 7:
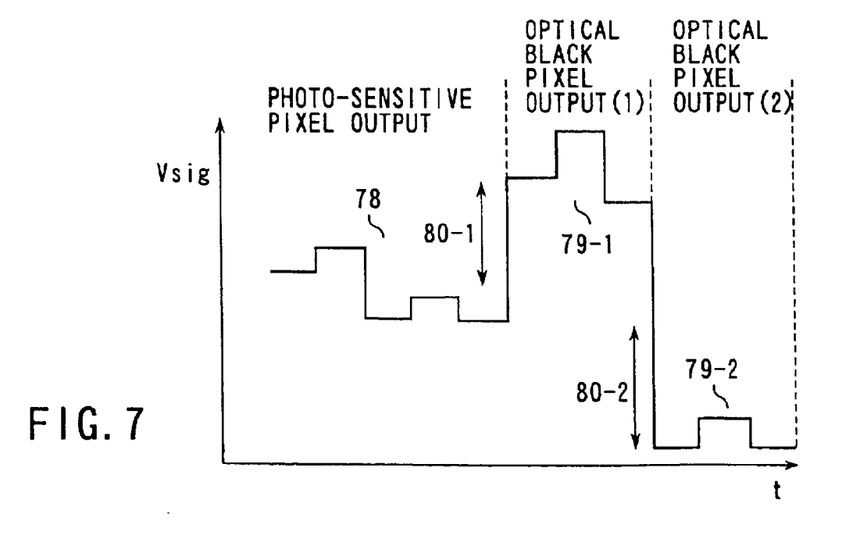
FIG. 7 is a diagram illustrating a signal waveform in a CMOS image sensor wherein two kinds of optical black pixel regions are provided.

In this point of view, as shown in FIG. 7, in the present embodiment two kinds of optical black pixel regions are provided to make two kinds of signal levels. Specifically, the following two kinds of optical black pixel regions are provided: an optical black pixel region (1) having the same structure as a photo-sensitive pixel region, and an optical black pixel region (2) having a structure making dark current small. In this case, there are generated a level difference 80-1 between a level of the signal 78 of the photo-sensitive pixel region and a level of a signal 79-1 of the optical black pixel region (1) and a level difference 80-2 between a level of the signal 78 of the photo-sensitive pixel region and a level of a signal level 79-2 of the optical black pixel region (2).

Figure 8:
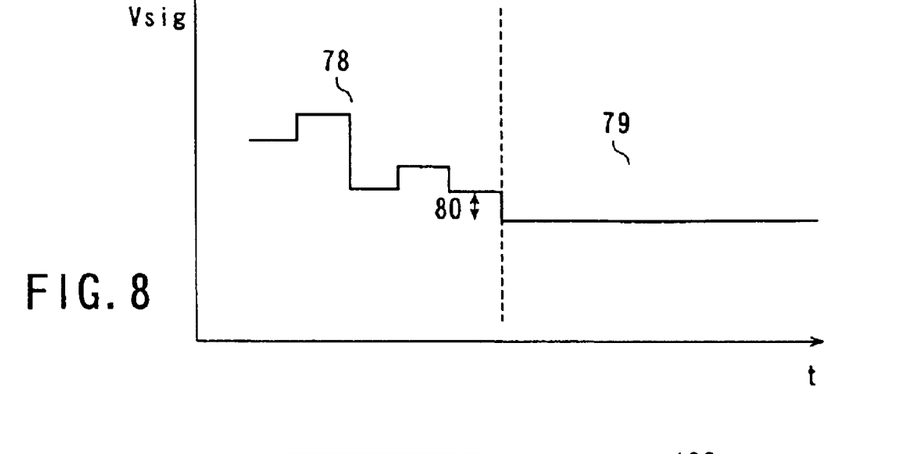
FIG. 8 is a diagram illustrating a signal waveform in a CMOS image sensor wherein 2 kinds of optical black pixel regions are provided and vertical signal lines in the respective optical black pixel regions are connected with each other.

When vertical signal lines in the optical black pixel region (1) are interconnected in the image sensing cell array with each other by a wiring and vertical signal lines in the optical black pixel region (2) are interconnected in the image sensing cell array with each other by another wiring, in the similar manner to those in the previous embodiments, the optical black level changes, as shown in FIG. 8. This makes it possible to make the optical black level smaller than the signal level 78 of the photo-sensitive pixel region. In the present embodiment, therefore, it is sufficient that a subsequent processing circuit can receive only larger signals than the optical black signal. Thus, only a smaller circuit margin is necessary.

Also in the present embodiment, at least one of the vertical signal lines in that of the optical black pixel regions which is at the side of said that photo-sensitive pixel region, may be excluded from being connected with said at least two vertical signal lines by the wiring. Furthermore, at least one of the vertical signal lines in that of the optical black pixel regions which is at the opposite side of said that photo-sensitive pixel region, may be excluded from being connected with said at least two vertical signal lines by the wiring.

With above-mentioned structure of the image sensor device, the same advantages as the first embodiment can be obtained. Moreover, even if the potentials at the optical black pixels at the edge portion of the optical black pixel region close to the photo-sensitive pixel region are changed by light leaked from the photo-sensitive pixel region into the edge portion of the optical black pixel region, it is possible to prevent the optical black level from being influenced by the change. Thus, the optical black signal can be made stable. Furthermore, even if the potentials at the optical black pixels at the opposite edge portion of the optical black pixel region are changed by light leaked from a peripheral portion opposite to the photo-sensitive pixel region into the opposite edge portion of the optical black pixel region, it is possible to prevent the optical black level from being influenced by the change. Thus, the optical black signal can be made more stable in the present embodiment than in the second embodiment.

Describing the feature of a solid state image sensor device according to the present embodiment in more general, since a plurality of optical black pixel regions are arranged the image sensing cell array portion, which have optical black levels different from each other, and a plurality of the vertical signal lines in the optical black pixel regions are short-circuited with each other by a wiring, then levels of the signals read out from the optical black pixels in each of the optical black pixel regions are averaged, and the averaged signal levels of the respective optical black pixel regions are also averaged. Thus, even if outputs from the optical black pixels of the optical black pixel regions vary, the outputs can be averaged to more reduce a variation in fixed pattern noises in the horizontal lines.

Figure 9A:
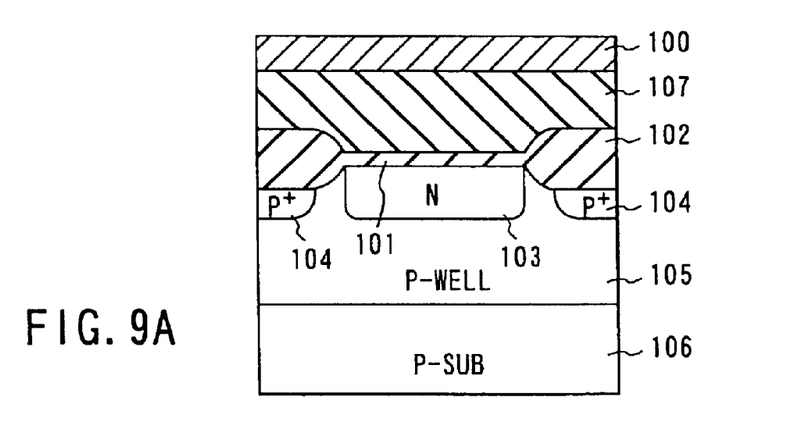
FIG. 9A is a cross section of an optical black pixel of a CMOS image sensor.
Figure 9B:
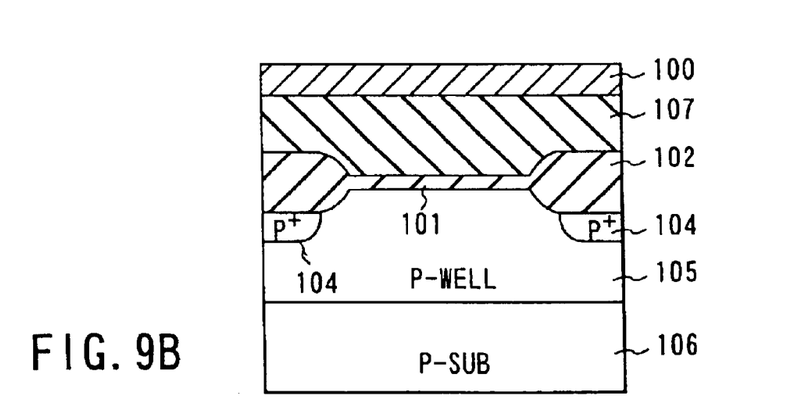
FIG. 9B is a cross section of another optical black pixel of a CMOS image sensor.

FIGS. 9A and 9B show cross sections of unit cells of the optical black pixel regions in the present embodiment. The unit cell of the optical black pixel region (1) shown in FIG. 7 is made as shown in, for example, FIG. 9A. That is, a photodiode opening 101 is provided beneath a light shielding layer 100 and covered by the light shielding layer 100. A photodiode (N-type area) 103 for accumulating electrical charge generated by photoelectric conversion is formed beneath the opening 101. The n-type region is isolated by a thick oxide layer 102. An impurity diffused region (P+ type region) 104 for making the isolation more effective is formed beneath the oxide layer 102 as an isolation layer. A P-well 105 is formed on a P-substrate 106, and the photo-diode is formed in the well 105. An insulating film 107 is formed on the oxide layer 102, and the light shielding layer 100 is formed on the insulating film 107.

On the other hand, the unit cell of the optical black pixel region (2) is provided as shown in, for example, FIG. 9B. In the unit cell of the optical black pixel region (2), the N-type region 103 as shown in FIG. 9A is removed from the pixel structure. Since the N-type region 103 is removed from the pixel structure shown in FIG. 9B, a generated dark current is less taken into the pixel region. As a result, a signal having a smaller level can be obtained.

The present invention is not limited to the abovementioned embodiments. The structure of photodiode or transistors constituting pixels is not limited to that shown in FIG. 1, and can be suitably modified according to the specification for designing. Moreover, the structure of the noise cancellor is not limited to that shown in FIG. 1 and can be suitably modified according to the specification for designing. If a sufficient SN ratio can be obtained without using the noise cancellor, any noise cancellor is unnecessary to be provided.

In the fourth embodiment, two kinds of optical black pixel regions having different optical black levels are provided.

However, three or more kinds of optical black regions may be arranged. Various modifications can be made within the scope of the present invention.

Describing the advantages of the present invention, even if outputs from the optical black pixel region vary, the outputs can be made uniform by electrically connecting at least two vertical signal lines for reading optical black signals in the optical black pixel region with each other. Thus, a variation in fixed pattern noises in the horizontal lines can be reduced.

Furthermore, the level of the optical black signal can be set to any value, since optical black pixel regions having different levels for defining their optical black level are provided, and vertical signal lines of these optical black pixel regions are electrically connected with each other so that an optical black signal having an averaged signal level is generated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A solid state image sensor device comprising:
    an image sensing cell array portion including a plurality of unit cells of voltage read-out type, the unit cells being arranged in a matrix form on a semiconductor substrate, the image sensing cell array portion having a photo-sensitive pixel region and an optical black pixel region, the unit cells of the photo-sensitive pixel region for sensing an image, and the unit cells of the optical black pixel region for defining an optical black level;
    a selecting circuit configured to select the unit cells of the image sensing cell array portion in a unit of one horizontal line of the image sensing cell array portion; and
    a plurality of vertical signal lines on which signals are read out from the unit cells selected by the selecting circuit, at least two of the vertical signal lines in the optical black pixel regions being directly connected with each other, with no switching elements therebetween.

2. A solid state image sensor device according to claim 1, wherein at least one of the vertical signal lines in the optical black pixel region is excluded from being short-circuited with said at least two vertical signal lines by a wiring.

3. A solid state image sensor device according to claim 1, wherein at least one of the vertical signal lines in the optical black pixel region, which is at the side of the photo-sensitive pixel region, is excluded from being short-circuited with said at least two vertical signal lines by a wiring.

4. A solid state image sensor device according to claim 1, wherein at least one of the vertical signal lines in the optical black pixel region, which is at the opposite side of the photo-sensitive pixel region, is excluded from being short-circuited with said at least two vertical signal lines by a wiring.

5. A solid state image sensor device according to claim 1, wherein at least one of the vertical signal lines in the optical black pixel region, which is at the side of the photo-sensitive pixel region, is excluded from being short-circuited with said at least two vertical signal lines by a wiring, and wherein at least one of the vertical signal lines in the optical black pixel region, which is at the opposite side of the photosensitive pixel region, is excluded from being short-circuited with said at least two vertical signal lines by a wiring.

6. A solid state image sensor device according to claim 1, wherein a wiring causes levels of the readout signals of said at least two vertical signal lines to be averaged.

7. A solid state image sensor device comprising:
    an image sensing cell array portion including a plurality of unit cells of voltage read-out type, the unit cells being arranged in n a matrix form on a semiconductor substrate, the image sensing cell array portion having a photo-sensitive pixel region and a plurality of optical black pixel regions having optical black levels different from each other, the unit cells of the photo-sensitive pixel region for sensing an image, and the unit cells of the optical black pixel regions for defining optical black levels;
    a selecting circuit configured to select the unit cells of the image sensing cell array portion in a unit of one horizontal line of the image sensing cell array portion; and
    a plurality of vertical signal lines on which signals are read out from the unit cells selected by the selecting circuit, at least two of the vertical signal lines in the optical black pixel regions being directly connected with each other, with no switching elements therebetween.

8. A solid state image sensor device according to claim 7, wherein at least one of the vertical signal lines in the optical black pixel regions is excluded from being short-circuited with said plurality of vertical signal lines by a wiring.

9. A solid state image sensor device according to claim 7, wherein at least one of the vertical signal lines in the optical black pixel regions, which is at the side of the photo-sensitive pixel region, is excluded from being short-circuited with said plurality of vertical signal lines by a wiring.

10. A solid state image sensor device according to claim 7, wherein at least one of the vertical signal lines in the optical black pixel regions, which is at the opposite side of the photo-sensitive pixel region, is excluded from being short-circuited with said plurality of vertical signal lines by a wiring.

11. A solid state image sensor device according to claim 7, wherein at least one of the vertical signal lines in the optical black pixel regions, which is at the side of the photo-sensitive pixel region, is excluded from being short-circuited with said plurality of vertical signal lines by a wiring, and wherein at least one of the vertical signal lines in the optical black pixel regions, which is at the opposite side of the photo-sensitive pixel region, is excluded from being short-circuited with said plurality of vertical signal lines by a wiring.

12. A solid state image sensor device according to claim 7, wherein the plurality of optical black pixel regions comprise at least two optical black pixel regions, the unit cells of one of which includes a PN junction diode as a photoelectric conversion element and the unit cells of the other of which includes no PN junction diode.

13. A solid state image sensor device according to claim 7, wherein a wiring causes levels of the readout signals of said plurality of vertical signal lines to be averaged.

14. A solid state image sensor device comprising:
    an image sensing cell array portion including a plurality of unit cells of voltage read-out type, the unit cells being arranged in a matrix form on a semiconductor substrate, the image sensing cell array portion having a photo-sensitive pixel region, a first optical black pixel region and a second optical black pixel region having an optical black level different from that of the first optical black pixel region, the unit cells of the photo-sensitive pixel region for sensing an image, and the unit cells of the first and second optical black pixel regions for defining optical black levels;

a selecting circuit configured to select the unit cells of the image sensing cell array portion in a unit of one horizontal line of the image sensing cell array portion; and a plurality of vertical signal lines on which signals are read out from the unit cells selected by the selecting circuit, at least two of the vertical signal lines in the optical black pixel regions being directly connected with each other, with no switching elements therebetween.

15. A solid state image sensor device according to claim 14, wherein at least one of the vertical signal lines in the first and second optical black pixel regions is excluded from being short-circuited with said at least two vertical signal lines by a wiring.

16. A solid state image sensor device according to claim 14, wherein at least one of the vertical signal lines in the first and second optical black pixel regions, which is at the side of the photo-sensitive pixel region, is excluded from being short-circuited with said at least two vertical signal lines by a wiring.

17. A solid state image sensor device according to claim 14, wherein at least one of the vertical signal lines in the first and second optical black pixel regions, which is at the opposite side of the photo-sensitive pixel region, is excluded from being short-circuited with said at least two vertical signal lines by a wiring.

18. A solid state image sensor device according to claim 14, wherein at least one of the vertical signal lines in the first and second optical black pixel regions, which is at the side of the photo-sensitive pixel region, is excluded from being short-circuited with said at least two vertical signal lines by the wiring, and wherein at least one of the vertical signal lines in the first and second optical black pixel regions, which is at the opposite side of the photo-sensitive pixel region, is excluded from being short-circuited with said at least two vertical signal lines by a wiring.

19. A solid state image sensor device according to claim 14, wherein the unit cells of the first optical black pixel region include a PN junction diode as a photoelectric conversion element and the unit cells of the second optical black pixel region include no PN junction diode.

20. A solid state image sensor device according to claim 14, wherein a wiring causes levels of the readout signals of said at least two vertical signal lines to be averaged.

* * * * *